(12) United States Patent
Calhoun et al.

(10) Patent No.: US 11,962,345 B2
(45) Date of Patent: Apr. 16, 2024

(54) CONFIGURABLE DISPERSION COMPENSATION IN A PLUGGABLE OPTICAL TRANSCEIVER

(71) Applicant: Precision Optical Technologies, Inc., Rochester, NY (US)

(72) Inventors: David M. Calhoun, Romansville, PA (US); Christopher Page, Rochester, NY (US)

(73) Assignee: PRECISION OPTICAL TECHNOLOGIES, INC., Rochester, NY (US)

( * ) Notice: Subject to any disclaimer, the term of this patent is extended or adjusted under 35 U.S.C. 154(b) by 0 days.

(21) Appl. No.: 17/581,519

(22) Filed: Jan. 21, 2022

(65) Prior Publication Data
US 2023/0239045 A1 Jul. 27, 2023

(51) Int. Cl.
*H04B 10/61* (2013.01)
*H04B 10/079* (2013.01)
(Continued)

(52) U.S. Cl.
CPC ....... *H04B 10/07951* (2013.01); *H04B 10/40* (2013.01); *H04B 10/54* (2013.01); *H04B 10/6161* (2013.01)

(58) Field of Classification Search
CPC .................................................. H04B 10/032
See application file for complete search history.

(56) References Cited

U.S. PATENT DOCUMENTS 6,178,025 B1 * 1/2001 Hardcastle ......... H04B 10/0771
398/31
6,320,687 B1 * 11/2001 Ishikawa ............ H04B 10/2525
398/213

(Continued)

FOREIGN PATENT DOCUMENTS

BR 102014017868 B1 * 12/2021 ......... H04B 10/6161
WO 2004032385 A1 4/2004

OTHER PUBLICATIONS

Hui et al., Fiber Optic Measurement Techniques, 2009, Elsevier, pp. 484-486 (Year: 2009).*

(Continued)

*Primary Examiner* — Jai M Lee
(74) *Attorney, Agent, or Firm* — Fox Rothschild LLP; Carol Thorstad-Forsyth

(57) ABSTRACT

Chromatic dispersion compensation is performed in one or more pluggable optical transceiver (POT) devices operating within an intensity-modulated direct-detection (IMDD) optical network. Compensation is performed within each POT using an electrical and/or optical chromatic dispersion module which are controlled by a set of parameters. A network computing device includes a computer processor and a host management interface for communicating with the POT. In the event of a link failure, the computer processor determines a second set of parameters to control the one or more dispersion compensation module(s) of the POT. The second set of parameters are different from a first set of parameters used to control the one or more compensation module(s) in the case of a first optical path. The computer processor causes the POT to use the second set of parameters in place of the first set of parameters.

23 Claims, 6 Drawing Sheets

(51) Int. Cl.
*H04B 10/40* (2013.01)
*H04B 10/54* (2013.01)

(56) References Cited

U.S. PATENT DOCUMENTS

| | | | | |
|---|---|---|---|---|
| 6,694,273 | B2* | 2/2004 | Kurooka | H04B 10/2513 |
| | | | | 702/68 |
| 7,146,066 | B2* | 12/2006 | Katagiri | H04B 10/25133 |
| | | | | 385/24 |
| 7,382,984 | B2* | 6/2008 | McNicol | H04B 10/505 |
| | | | | 398/147 |
| 8,112,004 | B2* | 2/2012 | Ishibashi | H04B 10/2513 |
| | | | | 398/208 |
| 8,121,481 | B2* | 2/2012 | Katagiri | H04B 10/25133 |
| | | | | 398/147 |
| 8,682,179 | B1* | 3/2014 | Harley | H04B 10/0775 |
| | | | | 398/195 |
| 8,750,726 | B2* | 6/2014 | Geyer | H04B 10/25133 |
| | | | | 398/208 |
| 8,798,483 | B2* | 8/2014 | Shu | H04B 10/25133 |
| | | | | 398/208 |
| 8,805,207 | B2* | 8/2014 | Tanimura | H04B 10/697 |
| | | | | 398/205 |
| 8,909,061 | B1* | 12/2014 | Varadarajan | H04B 10/6161 |
| | | | | 398/210 |
| 9,071,364 | B1* | 6/2015 | Voois | H04B 10/58 |
| 9,391,694 | B2* | 7/2016 | Tochio | H04L 45/28 |
| 9,559,782 | B2* | 1/2017 | Koebele | H04B 10/616 |
| 9,584,217 | B2* | 2/2017 | Bottari | H04J 3/0697 |
| 9,722,698 | B2 | 8/2017 | Dahan et al. | |
| 9,723,385 | B2* | 8/2017 | Hu | H04J 14/0295 |
| 10,484,239 | B2* | 11/2019 | Page | H04B 10/40 |
| 10,574,352 | B2 | 2/2020 | Roberts et al. | |
| 10,892,827 | B2 | 1/2021 | Way et al. | |
| 11,418,259 | B2* | 8/2022 | Way | H04B 10/25137 |
| 2003/0112496 | A1* | 6/2003 | Van Schyndel | H04B 10/66 |
| | | | | 359/337.5 |
| 2007/0071447 | A1* | 3/2007 | Ozaki | H04J 14/0227 |
| | | | | 398/147 |
| 2010/0329698 | A1* | 12/2010 | Nakashima | H04B 10/6161 |
| | | | | 398/208 |
| 2016/0006513 | A1* | 1/2016 | El-Ahmadi | H04L 1/0042 |
| | | | | 398/136 |

OTHER PUBLICATIONS

PCMag Encyclopedia, SFP, 2020 (Year: 2020).*
Dispersion Compensation with Fiber Bragg Gratings, 2020 (Year: 2020).*
"Fiber Optic Dispersion and other Non-Linear Effects" https://www.ofsoptics.com/fiber-optic-dispersion-and-other-non-linear-effects/.
Fundamental analog background: L.R. Rabiner and R.W. Schafer, "On the Behavior of Minimax FIR Digital Hilbert Transformers," The Bell System Technical Journal vol. 53, No. 2, Feb. 1974.
D. Hillerkuss and J. Leuthold, "Software-Defined Transceivers in Dynamic Access Networks," in Journal of Lightwave Technology, vol. 34, No. 2, pp. 792-797, 15 Jan. 15, 2016, doi: 10.1109/JLT.2015.2470089.
Ranzini, Stenio M., Francesco Da Ros, Henning Bülow, and Darko Zibar. 2019. "Tunable Optoelectronic Chromatic Dispersion Compensation Based on Machine Learning for Short-Reach Transmission" Applied Sciences 9, No. 20: 4332. https://doi.org/10.3390/app9204332.
C. Xie, "Chromatic Dispersion Estimation for Single-Carrier Coherent Optical Communications," in IEEE Photonics Technology Letters, vol. 25, No. 10, pp. 992-995, 15 May 15, 2013, doi: 10.1109/LPT.2013.2257729.
A. Carena, Y. Jiang, P. Poggiolini, G. Bosco, V. Curri and F. Forghieri, "Electronic dispersion pre-compensation in PM-QPSK systems over mixed-fiber links," 2014 The European Conference on Optical Communication (ECOC), 2014, pp. 1-4, doi: 10.1109/ECOC.2014.6964177.
R. Nagarajan, M. Filer, Y. Fu, M. Kato, T. Rope and J. Stewart, "Silicon photonics-based 100 Gbit/s, PAM4, DWDM data center interconnects," in Journal of Optical Communications and Networking, vol. 10, No. 7, pp. 25-36, Jul. 2018, doi: 10.1364/JOCN.10.000B25.
R. Nagarajan, I. Lyubomirsky and O. Agazzi, "Low Power DSP-Based Transceivers for Data Center Optical Fiber Communications (Invited Tutorial)," in Journal of Lightwave Technology, vol. 39, No. 16, pp. 5221-5231, 15 Aug. 15, 2021, doi: 10.1109/JLT.2021.3089901.

* cited by examiner

CONFIGURABLE DISPERSION COMPENSATION IN A PLUGGABLE OPTICAL TRANSCEIVER

BACKGROUND

Statement of the Technical Field

The inventive arrangements relate to communication networks, and more particularly to methods and systems for managing dispersion in an optical communication channel.

Description of the Related Art

Optical transceivers convert electrical signals from an electronic data device such as a switch or a router to an optical signal that can be transmitted and received over fiber optic cable. A pluggable optical transceiver (POT) is a type of optical transceiver that includes all required optical transmit and receive componentry in a single compact device. The device is pluggable in the sense that it is designed to be received in a specially designed interface receptacle of the electronic data device. In some cases, a pluggable optical transceiver may have a form factor and electrical interface which are defined by an industry standard known as a multi-source agreement (MSA) established by the Small Form Factor (SFF) Committee. Examples of such transceivers include the small form factor (SFP) pluggable and the quad small form-factor pluggable (QSFP).

Fiber optic chromatic dispersion is a nonlinear effect that results in inter-symbol interference and penalties to signal-to-noise ratio when information is modulated on an optical carrier and observed after square-law detection on a receiver. This well-known phenomena can be understood as involving different spectral components of an optical pulse traveling at different velocities through the optical fiber. With increasing optical path length, adjacent pulses in the signal can begin to overlap and thereby interfere with decoding the modulated data which is encoded in the signal. The chromatic dispersion limitations thus impair the effective transmission distance and/or data rate of such networks.

One way to compensate for the effects of chromatic dispersion involves the use of media and/or components provided external of the transceiver module with "equal but opposite" chromatic dispersion characteristics (i.e., negatively dispersive fiber). However, this technique is typically not implemented within ubiquitous, low-cost pluggable optical transceiver modules. This is due in part to the added expense commonly associated with such external media. But a further problem with this technique is that implementation of such external media can be unwieldy for network operators to configure. This is particularly true in scenarios involving dynamic or adaptive networks where the optical path conditions may change to accommodate a multitude of operating scenarios. Accordingly, use of such external media is not a satisfactory solution for use in existing fiber access networks.

A second method for addressing the problem of chromatic dispersion involves the use of expensive coherent modulation systems with built-in signal processing. This approach significantly increases the development, implementation, and operational complexity of a POT module, subsequently yielding increased capital and operational costs. This mechanism is also susceptible to shortcomings in the semiconductor supply chain and involves higher operational power consumption.

SUMMARY

Embodiments concern a method and system for controlling dispersion compensation. In a solution described herein, a first set of parameters are used to control one or more dispersion compensation module(s) (DCM) included within a pluggable optical transceiver (POT) in an intensity-modulated direct-detection (IMDD) optical network. The one or more compensation modules can include one or more of an electrical dispersion compensation module and an optical dispersion compensation module. The parameters are used to compensate for the effects of chromatic dispersion in a first optical path having a first chromatic dispersion characteristic. According to one aspect, the method can involve receiving by a host network computing device a notification of a link failure in the IMDD optical network. In some embodiments, the notification of the link failure is communicated to the host computer directly by the POT through the host management interface. In other scenarios, the host network computing device can receive the link failure notification from a network control server.

The link failure requires transitioning data communications from the first optical path to a second optical path having a second chromatic dispersion characteristic different from the first chromatic dispersion characteristic. In some scenarios, the second optical fiber may be selected from among a plurality of alternate optical fibers comprising the IMDD optical network, where such alternate optical fibers can be used in place of the first optical fiber to satisfy a communication requirement. The selecting of the second optical fiber can be automatically performed by at least one of the host network computing device and a network operations control server which controls the IMDD optical network.

In response to the link failure notification, the host network computing device selects or determines a second set of parameters different from the first set of parameters to control the at least one compensation module to compensate for the effects of chromatic dispersion in the second optical path. The host network computing device then communicates with the POT through a host management interface to reconfigure the POT to use the second set of parameters in place of the first set of parameters for dispersion compensation.

In some scenarios, the second optical path has an optical path length that is different as compared to the first optical fiber. For example, the first optical path can be comprised of a first optical fiber and the second optical path is comprised of a second optical fiber used in place of the first optical fiber. In this regard it will be understood that the second optical fiber may have a different physical length than the first optical fiber. Consequently, the one or more compensation module(s) will require a different set of parameters to compensate for the effects of chromatic dispersion in the second optical fiber as compared to the first optical fiber. According to one aspect, the host computer described herein can access the POT through the host management interface to determine at least one of the first and second set of parameters to be utilized when the first or second optical path is in use.

According to one aspect, the POT is configured to automatically determine at least one of the first and second sets of parameters. In some scenarios, the host network computing device obtains the second set of parameters from the POT after second set of parameters have been automatically determined by the POT. Alternatively, the host network computing device can calculate the second set of parameters based on seed information concerning a known length of the second optical fiber or a distance between a first POT and a second POT. The second set of parameters are advantageously obtained by the host network computing device prior to the occurrence of the link failure so that they are available and ready for use when the link failure occurs. The host network computing device can store the one or more sets of parameters that are obtained in a data store accessible to the network computing device.

Embodiments also include a network computing device. The network computing device includes a computer processor and a host management interface for communicating with a pluggable optical transceiver (POT). The computer processor is configured to receive a notification of a link failure in an intensity-modulated direct-detection (IMDD) optical network. The link failure requires transitioning data communications from a first optical path of the IMDD optical network having a first chromatic dispersion characteristic to a second optical path of the IMDD optical network having a second chromatic dispersion characteristic different from the first chromatic dispersion characteristic. In response to the link failure notification, the computer processor determines or selects a second set of parameters to control at least one compensation module of said POT. The second set of parameter are determined or chosen to compensate for the effects of chromatic dispersion in the second optical path. As such, the second set of parameters are different from a first set of parameters used to control the one or more compensation module(s) to compensate for the effects of chromatic dispersion in the first optical path. Once obtained, the second set of parameters are communicated to the POT through the host management interface. In the POT, the second set of parameters are used to reconfigure the POT in place of the first set of parameters.

BRIEF DESCRIPTION OF THE DRAWINGS

Embodiments will be described with reference to the following drawing figures, in which like numerals represent like items throughout the figures, and in which.

DETAILED DESCRIPTION

Figure 1:
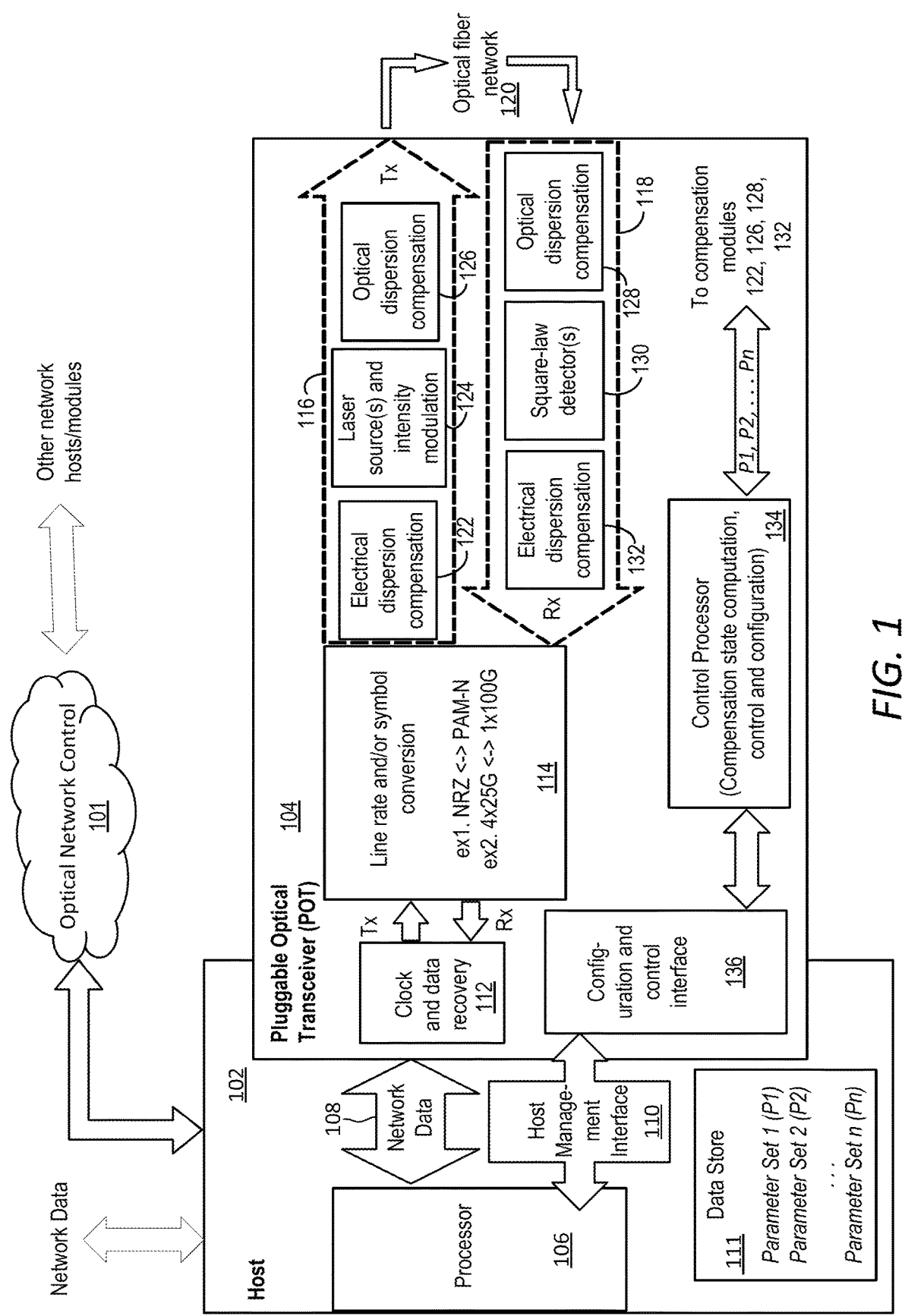
FIG. 1 is a block diagram that is useful for understanding an architecture of a host network computing platform and pluggable optical transceiver module in an intensity-modulated direct-detection (IMDD) optical network.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

Embodiments disclosed herein may provide certain advantages in an optical communication network, including for example an optical network operating in accordance with an Ethernet or Optical Transport Network (OTN) transport protocol. Chromatic dispersion is primarily a concern for DWDM optical networks (which are mostly comprised of transport/data center interconnect (DCI) and access networks). Legacy transport networks are point-to-point and typically utilize static dispersion compensation methods (dispersion compensating fiber/modules). This static compensation often necessitates significant architecture/operator know-how to bring up, maintain, and scale optical links. Unlike transport networks, access networks have a large quantity of dynamic and variable length links. Currently most of these links have been designed for and are running at slower data rates that are chromatic dispersion tolerant. The few links that require higher data rates utilize complex and expensive components such as transport regenerate/reamplify/retime hardware or coherent optical links.

A solution disclosed herein introduces software-defined, self-optimizing, and self-healing optical network control. The method involves methods for flexible configuration of dispersion compensation on the optical path as decided by a computer algorithm. Network-aware configurable dispersion compensation as described herein enables optical link configuration solutions in an automated way and is capable of servicing many transport and access network scenarios. According to one aspect, the solution combines host-side data metrics and module side configurability to facilitate dispersion compensation with minimal operator intervention in optical networks employing direct-detection links.

Where optical link dispersion compensation requirements are known in advance, a pluggable optical transceiver (POT) with dispersion compensation capability can be configured prior to module insertion in a host network computing platform, or at insertion time by a host network computing platform. This first technique will result in the shortest link down-time and will advantageously require no algorithmic communications/iterations between communicating transceivers to facilitate compensation setup. A second technique can be utilized where the dispersion compensation requirements are not known in advance, but there exists at least a certain limited amount of information about an optical link requiring compensation that is known in advance (i.e., before a communication session is initiated). This information can be used to determine "seed values" which will allow the necessary chromatic dispersion compensation to be optimized with only a moderate number of communications/iterations between host algorithms and module algorithms. A third technique can be utilized where no information is known in advance about the optical link requiring dispersion compensation. In such instances, the POT can engage in a discovery process by which the compensation requirements of a particular link are learned. The learning process can require a significant amount of host/module algorithmic communications/iterations and therefore can result in a relatively long link down-time while compensation requirements are discovered and implemented.

One aspect of the solution involves POT in which chromatic dispersion compensation is performed by one or more configurable compensation modules which utilize electrical and/or optical dispersion compensation. One or more different parameter sets are applied prior to module insertion or by may be applied by the host network computing device after module insertion. The parameter sets applied by the host network computing device can be set on an as-needed basis to configure the one or more dispersion compensation modules. These parameter sets used for one or more scenarios involving different optical paths used by the POT can be advantageously stored by the host network computing device in a non-volatile memory. A particular stored parameter set(s) can then be quickly accessed and applied by the host network computing device when needed to facilitate dispersion compensation for a particular optical path through which the POT needs to communicate. For example, this may occur when a first optical path link fails and a second optical path link is used in its place. In some scenarios, the POT is capable of automatically determining a suitable parameter set, which parameter set can then be read and stored by the host in association with a particular optical path. In other scenarios, one or more seed values can be provided to the POT by the host to help the parameter discovery process proceed more efficiently in the POT.

A block diagram is shown in FIG. 1 which is useful for understanding a host network computing device ("host") 102 and associated POT 104 which function cooperatively in an intensity-modulated direct-detection (IMDD) optical network. In some scenarios, the operations of host 102 and other similar network devices comprising the IMDD optical network can be coordinated by an optical network control system 101.

The host includes a computer processor 106, host management interface 110, and data store 111. The computer processor 106 facilitates various networking and control functions which are described below in greater detail. Host management interface 110 is a control interface that allows the host to communicate with the POT to facilitate certain configuration and control operations. In some scenarios, the host management interface can comprise an enhanced digital diagnostic interface defined by one or more industry groups for optical transceivers. As such, the digital diagnostic interface can allow the host computer to have real-time access to POT device operating parameters, control, and status registers. According to one aspect, the interface can be an extension of the 2-wire interface ID interface defined in the well-known gigabit interface converter (GBIC) specification for optical transceivers, and the SFP (small formfactor pluggable) Multisource Agreement Group (MSA). For example, the host management interface can be a Management Interface for SFP+ as defined by the Storage Networking Industry Association (SNIA) SFF Technology Affiliate (TA) Technical Work Group (TWG).

The data store 111 can store one or more sets of chromatic dispersion compensation parameters P1, P2, P3, . . . Pn and associated optical path or link data which may be used by the POT as described below. Electronic digital signals comprising network data 108 which is received by the host is communicated to the POT for transmission across an optical fiber network 120. When needed, the processor 106 can communicate with the POT to perform certain configuration and control operations as described herein by using the host management interface 110.

The POT 104 is a type of optical transceiver that includes all required optical transmit and receive componentry in a single compact device. According to one aspect, the device can be a pluggable device in the sense that it is designed to be received in a specially designed interface receptacle of the host 102. As such, the POT can have a form factor and electrical interface which are defined at least in part by an industry standard known as a multi-source agreement (MSA) established by the Small Form Factor Committee. In some scenarios, the POT may have a physical configuration corresponding to a small form factor (SFP) pluggable or a quad small form-factor pluggable (QSFP).

The POT 104 is comprised of a clock and data recovery module 112, line rate and/or symbol conversion module 114, transmit processing chain 116, receive processing chain 118, control processor 134, and configuration and control interface 136. The clock and data recovery module 112 recovers clock timing and digital data from the incoming electronic signals received from host 102. Line rate and/or symbol conversion module 114 is well-known in the art and therefore will not be described here in detail. Briefly however, this module can perform one or more operations involving conversion of the digital data line rate so that data sent and received by the POT is compatible with other optical transceivers operating in the optical fiber network 120. For example, these operations can involve conversion between 4×25G (i.e., 4 independent transmit and receive channels, each capable of 25 Gb/s) and 1×100G (i.e., 1 independent transmit and receive channel capable of 100 Gb/s). The module 114 can also perform operations involving the conversion of digital data symbols from one modulation encoding format to another encoding format. For example, these operations can involve conversion between a conventional non-return to zero NRZ modulation format and a PAM-N encoding format.

The transmit processing chain 116 includes a laser source and intensity modulation module 124 for modulating an optical signal to facilitate optical transmission of digital data. The transmit processing chain also advantageously includes one or more chromatic dispersion compensation modules. In some scenarios, the chromatic dispersion compensation modules can comprise an electrical dispersion compensation module 122 and/or an optical dispersion compensation module 126.

The receive processing chain 118 includes a square-law optical detector module 130 which converts incoming modulated optical signals from the optical network 120 to an electronic digital data signal. The receive processing chain also advantageously includes one or more chromatic dispersion compensation modules. In some scenarios, the chromatic dispersion compensation modules can comprise an optical dispersion compensation module 128 and/or an electrical dispersion compensation module 132.

Various known methods and systems can be used for implementing electrical and/or optical dispersion compensation and therefore will not be described here in detail. In some scenarios, the control processor can comprise one or more components such as a computer processor, an application specific circuit, a programmable logic device, a digital signal processor, or other circuit programmed to perform the functions described herein. The dispersion compensation modules 122, 126, 128, 132 as described can employ one or more mathematical algorithms which control the way that each module compensates for the negative effects of chromatic dispersion. Various algorithms now known or known in the future may be employed for this purpose and the exact algorithm used in a particular embodiment is not critical. Still, it should be noted that many of the algorithms for implementing electronic and/or optical dispersion compensation use one or more variable parameters or values which must be selected or set to adjust the compensation function of the algorithm to the particular chromatic dispersion problem created by a particular optical communication path defined within an optical fiber network.

The control processor 134 provided in the POT can perform various different operations or functions which include compensation state computation. The control processor can comprise one or more components such as a computer processor, a microcontroller, an application specific circuit, a programmable logic device, a digital signal processor, or other circuit programmed to perform the functions described herein. Embodiments can be realized in one computer device or several interconnected computer devices. Any kind of computer system or other apparatus can be employed provided that it is adapted for carrying out the methods described herein is suited. The control processor can have a computer program or firmware that can control the system such that it carries out the methods described herein.

The control processor can also perform operations to facilitate control and configuration of the various dispersion compensation modules 122, 126, 128, 132. The configuration and control interface 136 included as part of the POT 104 facilitates configuration and control operations involving the host management interface 110. As such, the configuration and control interface can receive information specifying various settings and operational parameters as specified by the host 102. For example, these settings and/or operation parameters can include certain parameters or values defined by parameter sets P1, P2, P3, . . . Pn which control the way that electrical and/or optical dispersion compensation is performed in compensation modules 122, 126, 128, 132.

Figure 2:
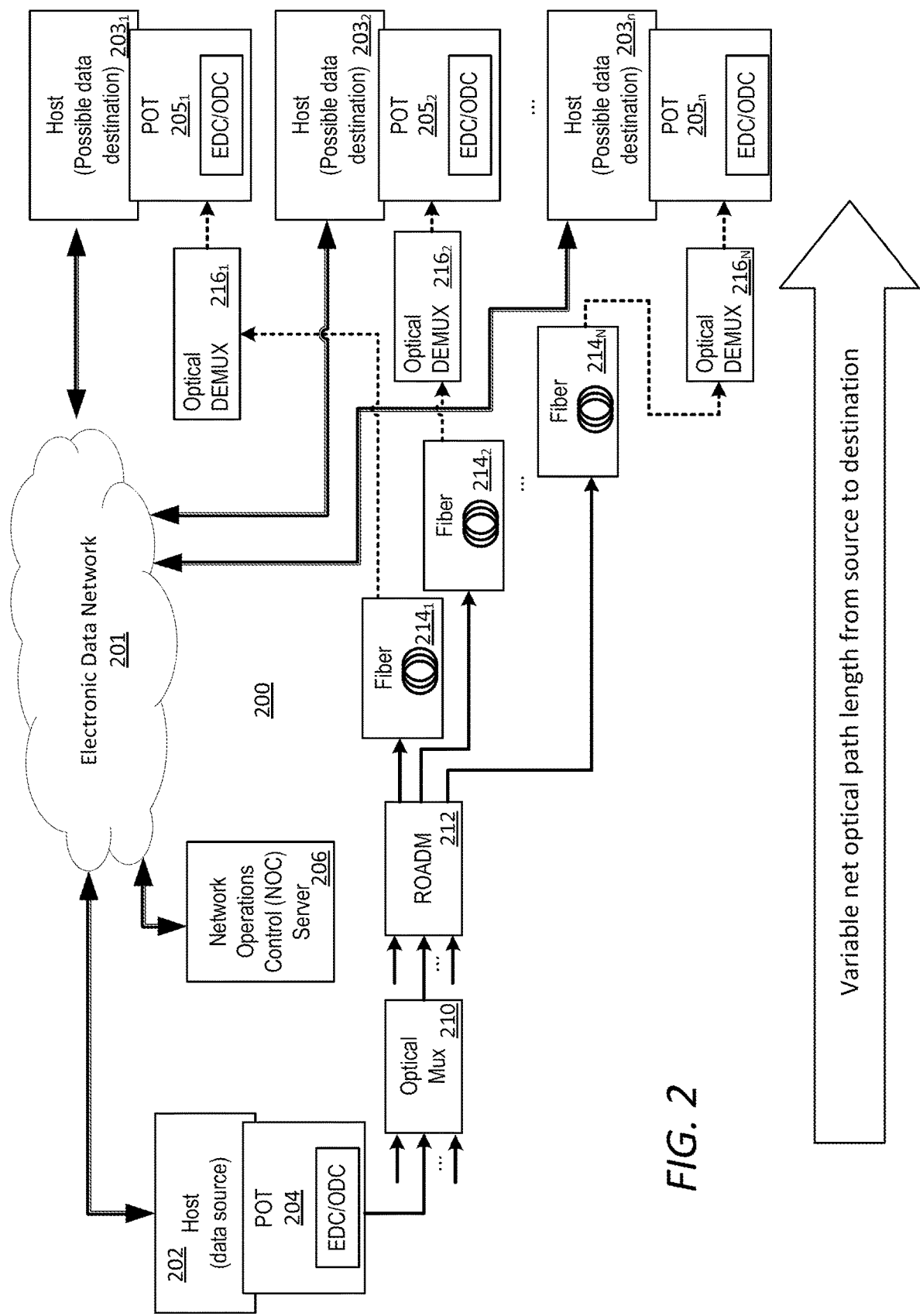
FIG. 2 is a block diagram that is useful for understanding a configuration of an IMDD optical network.

Shown in FIG. 2 is optical network 200 which includes a host 202, a plurality of host network computing device ("hosts") $203_1$, $203_2$, . . . $203_n$ and POTs 204, $205_1$, $205_2$, . . . $205_n$. Each of hosts 202 and $203_1$, $203_2$, . . . $203_n$ and POTs 204, $205_1$, $205_2$, . . . $205_n$ can be similar respectively to the host 102 and POT 104 described herein in relation to FIG. 1. As such, each of the POTs may include one or more compensation modules for performing chromatic dispersion compensation. These compensation modules may be similar to chromatic dispersion compensation modules 122, 126, 128, 132 described in relation to FIG. 1 and are collectively referred to as electronic dispersion compensation/optical dispersion compensation (EDC/ODC) modules in FIG. 2. In optical network 200, hosts 202 and $203_1$, $203_2$, . . . $203_n$ can be in communication with one or more network operations control (NOC) server(s) 206 by means of an electronic data network 201. The one or more NOC server(s) can control and coordinate certain aspects of the optical network operations by communicating with the hosts and other network devices through the digital data network 201.

It may be understood from FIG. 2 that optical network data communications can be facilitated between one or more of the hosts 202 and $203_1$, $203_2$, . . . $203_n$ by utilizing POTs 204, $205_1$, $205_2$, . . . $205_n$. In the example scenario shown in FIG. 2, it is assumed that host 202 is using POT 204 to transmit network data to one or more of hosts $203_1$, $203_2$, . . . $203_n$ utilizing POTs $205_1$, $205_2$, . . . $205_n$. Other optical devices shown in network 200 include Reconfigurable Optical Add/Drop Multiplexer (ROADM) 212, optical fibers $214_1$, $214_2$, . . . $214_N$, and optical de-multiplexers (DEMUXs) $216_1$, $216_2$, . . . $216_N$. The ROADM 212 can be used to remotely switch network, data traffic in a wavelength division multiplexed optical network. In the network 200 the ROADM is used to selectively direct optical signals to any one of the optical fibers $214_1$, $214_2$, . . . $214_N$. The ROADM may thus be used in network 200 to selectively use different ones of the optical fibers $214_1$, $214_2$, . . . $214_N$ to transmit data to a particular one of the remote network host computers. For example, data traffic can be redirected to any one of the hosts $203_1$, $203_2$, . . . $203_n$) to accommodate a link failure associated with one of the optical fibers $214_1$, $214_2$, . . . $214_N$ and/or to facilitate a change in routing of network data traffic.

It will be appreciated that there are many advantages to using a ROADM in optical networks. These devices allow a remote optical network control system to reroute optical data traffic manually or automatically through a different optical path. But in many instances, dynamically changing an optical fiber through which signals are routed will necessarily change the characteristics of any chromatic dispersion which occurs as signals transit through the optical path. When changes in the network occur, there will be a variable net optical path length from the source of the optical signals to the destination for the optical signals. For example, in FIG. 2 consider a scenario in which optical signals are communicated from data source host POT 204 to destination host POT $205_1$ through fiber $214_1$. In the event of a link failure in fiber $214_1$ a network operations control (NOC) server can cause the ROADM 212 to redirect optical data from POT 204 to a different destination host $205_2$ through fiber $214_2$. But this creates a problem when using POTs which include a dispersion compensation mechanism. The one or more parameters which are appropriately used in a dispersion compensation algorithm for a first optical path comprising $214_1$ will often be different as compared to those parameters needed to effectively perform dispersion compensation for a different optical path (e.g., an optical path comprising $214_2$).

Figure 3:
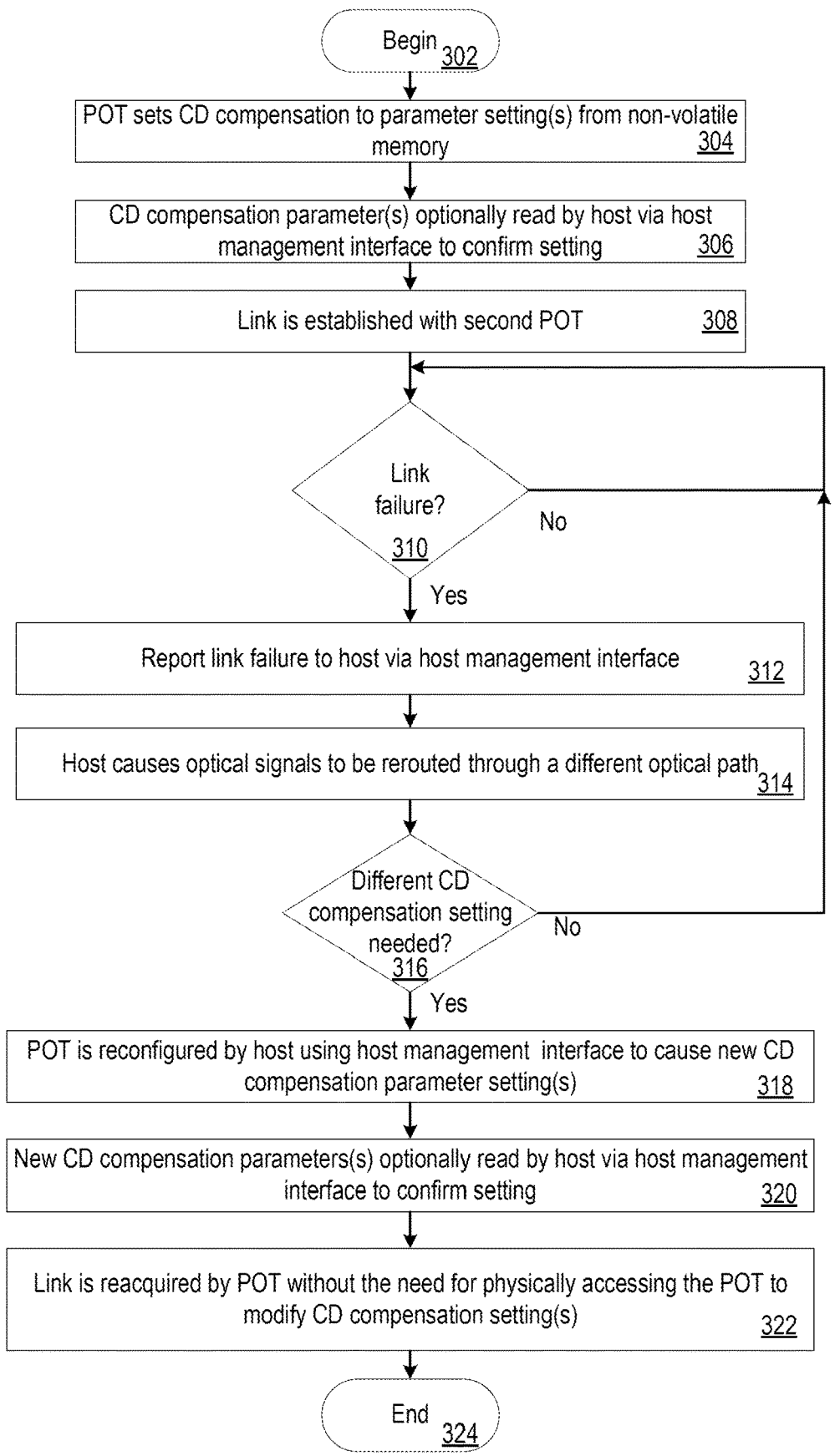
FIG. 3 is a flowchart that is useful for understanding a method for controlling the operation of one or more compensation modules used in a POT for chromatic dispersion compensation.

Shown in FIG. 3 is a flowchart that is useful for understanding a method that facilitates rapid reconfiguration of a dispersion compensation algorithm in a POT based on changes that may dynamically occur in an optical network environment. In the embodiment shown in FIG. 3, the optical network employs a POT similar to POT 104 incorporating one or more chromatic dispersion (CD) compensation modules. The process begins in 302 and continues to 304 where the POT upon initialization sets one or more parameters of a CD compensation algorithm to one or more predetermined parameter value(s). In some scenarios, the predetermined value(s) can be stored in a non-volatile memory in the POT. For example, the predetermined value(s) can be last value(s) which were previously used by the POT in the particular algorithm. The setting in such a scenario can correspond to one or more CD compensation parameter values that were previously determined to be suitable for a particular optical path which the POT was last using to communicate optical data.

At 306 the one or more parameters that are applied can be read by the host system. To perform such a read operation, the host system will advantageously use its host management interface to access one or more data registers in the POT. This read operation will allow the host system to determine the parameter value settings which the POT is using for CD compensation in a particular network installation. The host system can then store these one or more parameter settings in a look-up-table (LUT) or relational database in which the one or more parameter settings are related to a particular optical path that the POT is currently utilizing for optical data communications.

At 308 the process will continue with the POT establishing a link with a second POT in the optical network. For example, this link establishment can proceed in accordance with conventional protocols for link establishment in one or more networks employing an Ethernet or OTN communication protocol. In the example network shown in FIG. 2, an example of this link establishment could include POT 204 establishing a link with POT $205_1$ in an IMDD network. Once the link is established the POT will continually evaluate the link status at 310 to determine if a link failure has occurred. If no link failure occurs (310: No), the communication session continues without interruption. However, if a link failure does occur (310: Yes) the POT will report 312 the link failure to the host computer. For example, this report can be communicated by the POT through the configuration and control interface provided in the POT, operating in conjunction with the host management interface 110. In some scenarios, the POT can set a flag in a predetermined register of the configuration and control interface to indicate when a link failure has occurred.

Once the host network computing device is made aware of the link failure, appropriate steps can be taken at 314 to facilitate re-routing of the optical signals from POT 204 through a different optical path. For example, in the scenario shown in FIG. 2, the ROADM 212 could reroute the communication path from POT 204 from a first optical path to POT $205_1$ to a second optical path to POT $205_2$. The second optical path can transit through a different optical fiber which is not experiencing a link failure. For example, in the foregoing scenario instead of transiting through fiber $214_1$, the ROADM can cause the optical signals to transit through fiber $214_2$.

In some scenarios, the transition to the second optical path can occur under the direct supervision and control of the host 202. The host 202 can cause the ROADM to switch the communications path for POT 204 to a different optical path. However, in other scenarios this transition to a different optical path can occur in accordance with a network control operation implemented by NOC server 206. In such a scenario, a host (e.g., host 202) can communicate with the NOC server using electronic data network 201. This communication can inform the NOC server of the occurrence of the link failure. In response to such notification, the NOC server can then cause the ROADM to redirect the optical communications to a different path as described. If the transition is controlled by the NOC server, then the NOC server can also provide the host 202 with information specifying the new optical path which is being used to facilitate the link. In either scenario, the host 202 will advantageously store the new information about the optical path which is to be used. For example, this information can be recorded in a data store 111.

Following the occurrence of the transition to the new optical path, the host (e.g., host 202) can determine at 316 whether a different compensation parameter setting is needed in the POT. In some scenarios, the new optical path which is being used may be of the same length as the failed optical path. In that case, the new optical path may have the same chromatic dispersion as the failed optical path, and no change to the compensation parameters may be required. However, in many instances the transition to a different optical path can involve a change in chromatic dispersion characteristics. In such scenarios, new CD compensation parameters may be needed for implementing one or more CD compensation algorithms in the POT.

If a determination is made at 316 that no change is needed to the compensation parameter (316: No) then the process returns to 310 where the host resumes monitoring of the link status. However, if the change in optical path does require resetting of the CD compensation parameters (316: Yes) then the process continues on to 318 where the POT can be reconfigured by the host using the host management interface to set one or more new CD compensation parameters. This process can involve the host accessing its LUT or relational database to determine appropriate CD compensation parameters which should be used for the particular optical path through which communications are currently being conducted.

Figure 4:
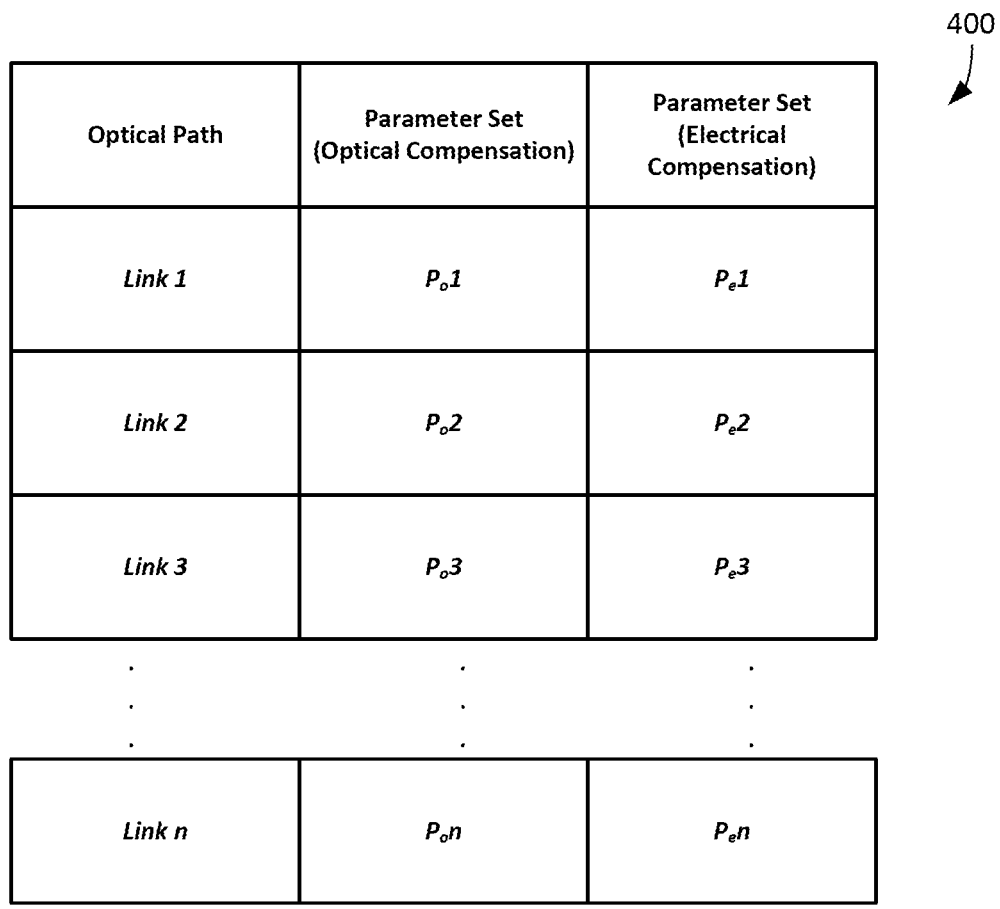
FIG. 4 is a look up table which may be used by a host for determining one or more parameter values.

Shown in FIG. 4 is an example of an LUT 400 which may be used by a host for determining one or more parameter values which should be used in associate with one or more optical links. In this example, there are a total of n possible links and two parameter sets for each link. For each link, a first parameter set $P_o n$ includes parameters for an optical CD compensation module, and a second parameter set $P_e n$ includes parameter for an electrical compensation module. Of course, both parameter sets may not be needed in every instance. For example, some POTs may only have an optical CD compensation module or an electrical CD compensation module. In such instances, only a single parameter set may be needed for each link. Further, it should be understood that each parameter set may include a single value or a plurality of values for controlling the operations of a particular CD compensation module employing a particular algorithm. At 318 the host will use information concerning a particular link that is in use to determine which parameter set should be used in a POT. The necessary parameter set is then accessed and set in the POT using the host management interface.

At 320, the host can optionally use the host management interface to read CD compensation parameter values which have been set in the POT. The values should match the values that the host has instructed the POT to set and serve as a confirmation. At 322 the new optical path is used to reestablish the optical link, and CD compensation proceeds using the new parameter values which have been set. At 324 the process will end, or the host may continue with additional processing.

The link information and parameter values in relational database or LUT 400 can be entered manually or can be discovered by a host over a period of time using information provided by a POT. In some scenarios, each time that a POT utilizes a different link, the POT can discover a set of optimal CD compensation parameters that should be used with that link. This discovery process can take some time to occur, so it is preferable to have the parameter values already available from the host. However, on the first occasion when a particular POT uses a particular optical link having a defined optical path, the host may not have the parameter information available. Accordingly, POT can discover a set of appropriate parameters to be used. These parameter values can then be read and recorded by the host for future instances when the same optical path is utilized.

Figure 5:
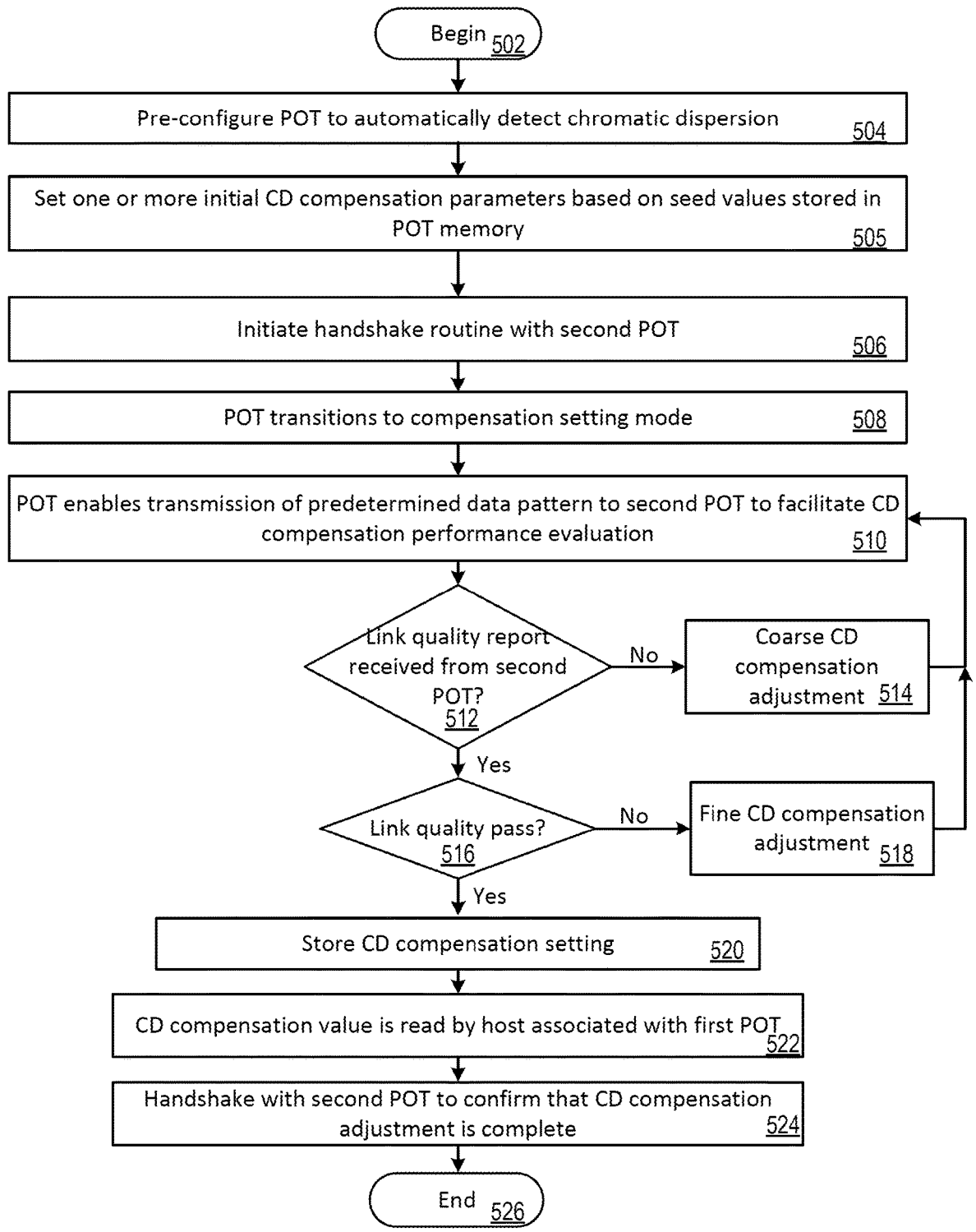
FIG. 5 is a flowchart that is useful for understanding a method for automatically determining a set of compensation parameters that are used in a POT for chromatic dispersion compensation.

The process by which the POT can discover one or more CD compensation parameters is described in relation to FIG. 5. The process begins at 502 and continues to 504 where a first POT (e.g. POT 204) can be configured to automatically detect the presence of excessive amounts of chromatic dispersion on a particular optical link. The exact form of this automatic detection process is not critical provided that the first POT is able to detect when the presence of excessive chromatic dispersion is negatively effecting link performance. In some scenarios described herein, this detection process may involve using the optical link to transmit predetermined test data to a second POT (e.g., POT $205_1$). The second POT can then transmit back to the first POT a report regarding link quality. For example, in some embodiments the report can specify a bit error rate (BER) in the transmitted test data. The first POT can determine that excessive chromatic dispersion is present based on the link quality report.

The process continues to 505 where the first POT initializes one or more CD compensation modules included in the POT. This process can involve setting one or more CD compensation parameter value(s) which are used in compensation algorithms which are applied to transmitted and/or received signals by the compensation modules. In a situation involving an optical link where the correct CD compensation parameter value(s) are unknown, the first POT can use one or more seed values stored in a non-volatile memory location. The seed values can advantageously provide a starting point for estimating optimal CD compensation values in the process described herein.

In some scenarios, the same seed values can be used to initialize the compensation modules in all instances and without any regard for the for the characteristics of the optical link. However, in other scenarios, particular seed values can be applied in the POT based on some knowledge about the link characteristics. For example, different seed values can be provided by a host in accordance with an approximate known length of the optical path or a known distance between two hosts. These seed values can be obtained by the host from a look up table where certain seed values are used in accordance with the known link characteristics. Alternatively, the appropriate seed values can be estimated or calculated by a host computer based on known link characteristics.

In some scenarios, the estimated seed values can be determined by the host using a machine learning algorithm. The machine learning algorithm can utilize information regarding CD compensation parameter values which have previously been found optimal for various length optical paths and/or distances between two transceivers. This information can be used by the host to estimate suitable seed values based on known link characteristics of a particular assigned link such as estimated path length or distance between transceivers. Information concerning the link characteristics such as path length and or distance between transceivers can be stored in a database maintained by the host computer. However, in other scenarios, this information can be provided to the host by a NOC server. In such scenarios, the link characteristics can be communicated to the host computer when the NOC server informs the host of a particular optical path or link that it will utilize for communicating data traffic. The seed values can be communicated by the host to the POT using the host management interface.

After the one or more compensation modules have been initialized, the process continues to 506. Operations at 506 involve performing a handshake routine to initialize optical communication between by the first POT and a second POT through a selected optical path. At 508, the first POT transitions to a compensation setting mode. In the compensation setting mode at 510 the POT enables transmission of a predetermined data pattern to the second POT. The predetermined data pattern is one that is known by both the first and second POT. When a first POT receives such data from a second POT it can compare the received data to the predetermined data pattern and determine whether chromatic dispersion has corrupted the transmitted data. Accordingly, the predetermined data pattern can be used to facilitate chromatic dispersion compensation performance evaluation.

After the second POT evaluates the received data pattern from the first POT, it will generate a link quality report. In some scenarios, the link quality report can specify a bit error rate which was noted when the transmitted data pattern was received at the second POT. However, the solution is not limited in this regard and other metrics can also be used to specify the link quality. Once generated, the link quality report can be transmitted to the first POT. For example, the link quality report can be communicated by the second POT to the first POT using the optical link which is being evaluated for chromatic dispersion. Accordingly, a determination can be made at 512 as to whether the link quality report has been received from the second POT.

In some scenarios, a link quality report may not be received by the first POT. For example, this can occur if excessive chromatic dispersion prevents the predetermined data pattern from being successfully received by the second POT. It can also occur if the degree of chromatic dispersion caused by a particular optical link is too excessive to allow the link quality report to be successfully received by the first POT. Accordingly, if no link quality report is received by the first POT (512: No), this will serve as an indication that a substantial adjustment is needed with respect to one or more parameters that are being used for CD compensation. This adjustment can then be performed at 514 where a coarse adjustment is made to one or more parameters being used for CD compensation. The process then returns to 510 where the predetermined data is retransmitted to the second POT in another attempt to acquire a link quality report from the second POT.

Once the first POT determines that a link quality report has been received (512: Yes) the process continues on to 516 where a determination is made as to whether the link quality is acceptable. If not (516: no), then the process continues to 518 where the POT performs a fine adjustment of one or more parameters which are being used in the first POT for CD compensation. The fine adjustment will involve a smaller increment of change to the one or more compensation values as compared to the course adjustment performed at 514. Once the fine adjustment is performed at 518, the process returns to 510 where the predetermined data is retransmitted to the second POT. The second POT will generate a new link quality report based on the re-transmitted data and will transmit the new report to the first POT. This iterative process will repeat until the first POT determines that a satisfactory link quality report has been received (516: Yes).

Once the first POT has determined at 516 that the parameters being used for CD compensation are facilitating a satisfactory link quality, the first POT will at 520 store these CD compensation settings in a register or memory location where they are accessible to the host computer. Thereafter the CD compensation parameter values can be read at 522 by the host (e.g., host 202) for use in subsequent sessions where the same optical link or path is being used. This will avoid the necessity of parameter discovery process in subsequent communication sessions when it is known that the same optical link will be used. At 524 the first POT can complete a further handshake routine with the second POT to confirm that the CD compensation process is complete. At this point in the process, the first and second POT can proceed with communicating data traffic using the CD compensation modules to minimize the negative effects of chromatic distortion. Thereafter, the process can end, or the system may continue with further processing.

In the solution disclosed herein, embodiments of the host network computing device can be realized in one computer system. Alternative embodiments can be realized in several interconnected computer systems. Any kind of computer system or other apparatus adapted for carrying out the methods described herein is suited. A typical combination of hardware and software can be a general-purpose computer system. The general-purpose computer system can have a computer program that can control the computer system such that it carries out the methods described herein. A computer system as referenced herein can comprise various types of computing systems and devices, including a server computer or any other device capable of executing a set of instructions (sequential or otherwise) that specifies actions to be taken by that device. In some scenarios, the computer system can comprise one or more components such as a computer processor, an application specific circuit, a programmable logic device, a digital signal processor, or other circuit programmed to perform the functions described herein.

Figure 6:
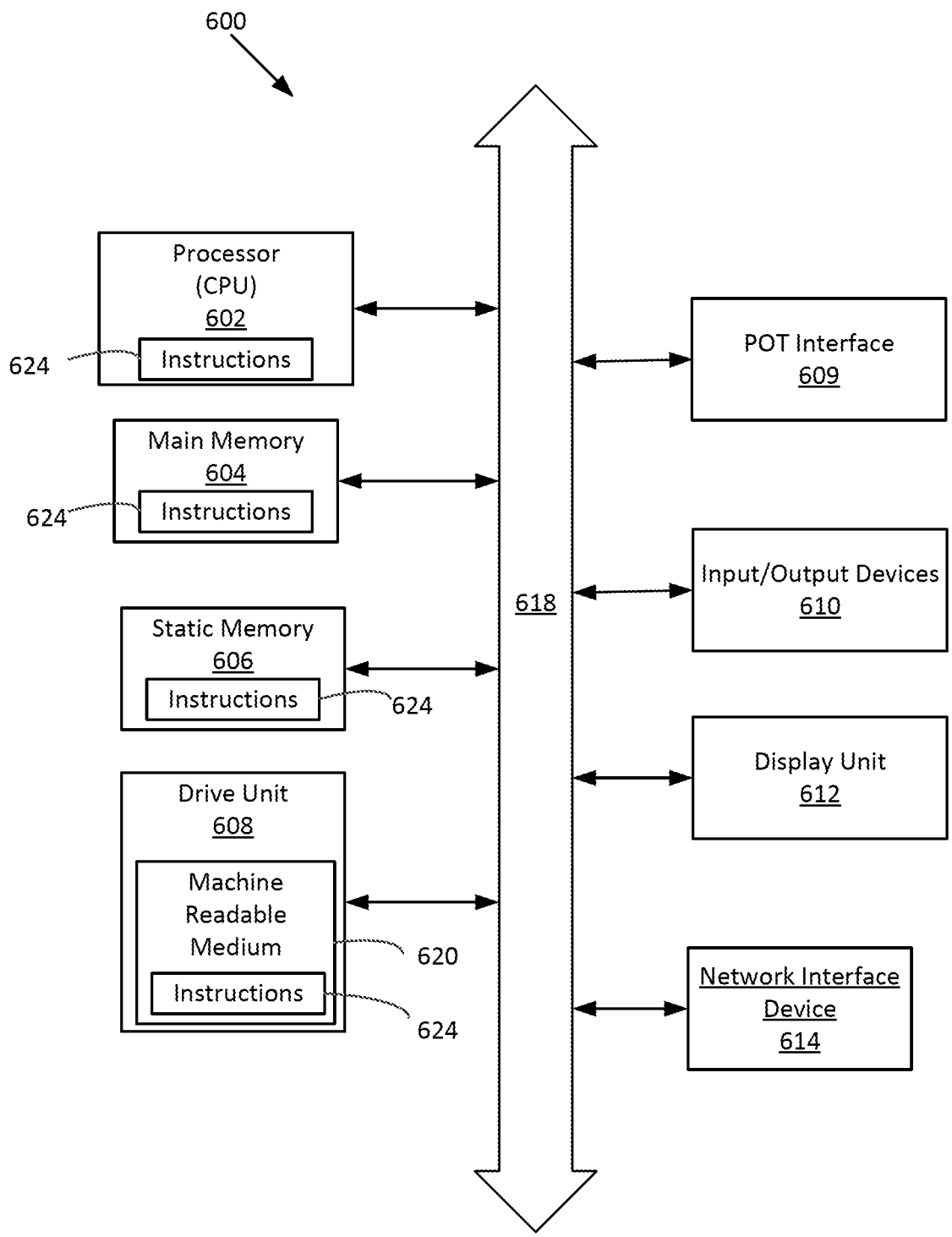
FIG. 6 is a block diagram of an exemplary host network computing platform that can perform certain processing operations as described herein for chromatic dispersion compensation.

Shown in FIG. 6 is a hardware block diagram comprising an exemplary computer system 600. The computer system can include a set of instructions which are used to cause the system to perform any one or more of the methodologies discussed herein. In one or more embodiments, the exemplary computer system 600 can correspond to each of the host network computing devices 102/202 and/or the NOC server 206. In some embodiments, the computer 600 can be operatively connected (networked) to other machines in a distributed environment to facilitate certain operations described herein. Accordingly, while only a single machine is illustrated in FIG. 6 it should be understood that embodiments can be taken to involve any collection of machines that individually or jointly execute one or more sets of instructions as described herein.

The computer system 600 is comprised of a processor 602 (e.g. a central processing unit or CPU), a main memory 604, a static memory 606, a drive unit 608 for mass data storage and comprised of machine readable media 620, input/output devices 610, a display unit 612 (e.g. a liquid crystal display (LCD) or a solid state display), and a network interface device 614. In the case of a host computer, the system can also include a POT interface which is configured to facilitate communication of data traffic which is transmitted or received by the POT. The POT interface can also incorporate a host management interface to facilitate configuration of a POT to which it is connected. Communications among the various components of computer system 600 can be facilitated by means of a data bus 618.

One or more sets of instructions 624 can be stored completely or partially in one or more of the main memory 604, static memory 606, and drive unit 608. The instructions can also reside within the processor 602 during execution thereof by the computer system. The input/output devices 610 can include a keyboard, a mouse, a multi-touch surface (e.g. a touchscreen) and so on. The network interface device 614 can be comprised of hardware components and software or firmware to facilitate network data communications in accordance with a network communication protocol utilized by a data network (e.g., electronic data network 201).

The drive unit 608 can comprise a machine readable medium 620 on which is stored one or more sets of instructions 624 (e.g. software) which are used to facilitate one or more of the methodologies and functions described herein. The term "machine-readable medium" shall be understood to include any tangible medium that is capable of storing instructions or data structures which facilitate any one or more of the methodologies of the present disclosure. Exemplary machine-readable media can include magnetic media, solid-state memories, optical-media and so on. More particularly, tangible media as described herein can include; magnetic disks; magneto-optical disks; CD-ROM disks and DVD-ROM disks, semiconductor memory devices, electrically erasable programmable read-only memory (EEPROM)) and flash memory devices. A tangible medium as described herein is one that is non-transitory insofar as it does not involve a propagating signal.

Computer system 600 should be understood to be one possible example of a computer system which can be used in connection with the various embodiments. However, the embodiments are not limited in this regard and any other suitable computer system architecture can also be used without limitation. Dedicated hardware implementations including, but not limited to, application-specific integrated circuits, programmable logic arrays, and other hardware devices can likewise be constructed to implement the methods described herein. Applications that can include the apparatus and systems of various embodiments broadly include a variety of electronic and computer systems. Some embodiments may implement functions in two or more specific interconnected hardware modules or devices with related control and data signals communicated between and through the modules, or as portions of an application-specific integrated circuit. Thus, the exemplary system is applicable to software, firmware, and hardware implementations.

Further, it should be understood that embodiments can take the form of a computer program product on a tangible computer-usable storage medium (for example, a hard disk or a CD-ROM). The computer-usable storage medium can have computer-usable program code embodied in the medium. The term computer program product, as used herein, refers to a device comprised of all the features enabling the implementation of the methods described herein. Computer program, software application, computer software routine, and/or other variants of these terms, in the present context, mean any expression, in any language, code, or notation, of a set of instructions intended to cause a system having an information processing capability to perform a particular function either directly or after either or both of the following: a) conversion to another language, code, or notation; or b) reproduction in a different material form.

Reference throughout this specification to features, advantages, or similar language does not imply that all of the features and advantages that may be realized should be or are in any single embodiment. Rather, language referring to the features and advantages is understood to mean that a specific feature, advantage, or characteristic described in connection with an embodiment is included in at least one embodiment. Thus, discussions of the features and advantages, and similar language, throughout the specification may, but do not necessarily, refer to the same embodiment.

Furthermore, the described features, advantages and characteristics disclosed herein may be combined in any suitable manner in one or more embodiments. One skilled in the relevant art will recognize, in light of the description herein, that the embodiments can be practiced without one or more of the specific features or advantages of a particular embodiment. In other instances, additional features and advantages may be recognized in certain embodiments that may not be present in all embodiments.

Reference throughout this specification to "one embodiment", "an embodiment", or similar language means that a particular feature, structure, or characteristic described in connection with the indicated embodiment is included in at least one embodiment. Thus, the phrases "in one embodiment", "in an embodiment", and similar language throughout this specification may, but do not necessarily, all refer to the same embodiment.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

Although the embodiments have been illustrated and described with respect to one or more implementations, equivalent alterations and modifications will occur to others skilled in the art upon the reading and understanding of this specification and the annexed drawings. In addition, while a particular feature of an embodiment may have been disclosed with respect to only one of several implementations, such feature may be combined with one or more other features of the other implementations as may be desired and advantageous for any given or particular application. Thus, the breadth and scope of the embodiments disclosed herein should not be limited by any of the above described embodiments. Rather, the scope of the invention should be defined in accordance with the following claims and their equivalents.

We claim:

1. A method for controlling dispersion compensation, comprising:
    selecting at least one dispersion compensation module of a plurality of dispersion compensation modules included within an industry-standard small form factor pluggable optical transceiver (POT) to be initialized, wherein the plurality of dispersion compensation modules comprise both an electrical dispersion compensation module and an optical dispersion compensation module;
    causing a first set of parameters to control the selected at least one dispersion compensation module to compensate for the effects of chromatic dispersion in a first optical path having a first chromatic dispersion characteristic;
    receiving by a host network computing device a notification of a link failure in an optical network which requires transitioning data communications from the first optical path to a second optical path having a second chromatic dispersion characteristic different from the first chromatic dispersion characteristic;
    determining by the host network computing device a second set of parameters different from the first set of parameters to control the at least one dispersion compensation module to compensate for the effects of chromatic dispersion in the second optical path; and
    using the host network computing device to communicate with the POT through a host management interface to reconfigure the POT to use the second set of parameters in place of the first set of parameters for dispersion compensation;
    wherein the POT is configured to automatically determine at least one of the first and second set of parameters;
    wherein the host network computing device provides seed values to the POT to facilitate automatically determining the second set of parameters, the seed values based on a known length of the second optical fiber or a known distance between a first POT and a second POT.

2. The method of claim 1, wherein the second optical path has an optical path length that is different as compared to an optical path length of the first optical path.

3. The method of claim 2, wherein the first optical path is comprised of a first optical fiber and the second optical path is comprised of a second optical fiber used in place of the first optical fiber.

4. The method of claim 3, wherein the second optical fiber has a different physical length than the first optical fiber, whereby the at least one dispersion compensation module requires a different set of parameters to cause the at least one dispersion compensation module to compensate for the effects of chromatic dispersion in the second optical fiber as compared to the first optical fiber.

5. The method according to claim 3, further comprising selecting the second optical fiber from among a plurality of alternate optical fibers which can be used in place of the first optical fiber.

6. The method of claim 5, wherein the selecting of the second optical fiber is automatically performed by at least one of the host network computing device and a network operations control server which controls the optical network.

7. The method of claim 1, further comprising using the host computer to access the POT through the host management interface to determine at least one of the first and second set of parameters to be utilized when the first or second optical path is in use.

8. The method according to claim 1, wherein the notification of the link failure is communicated to the host computer directly by the POT through the host management interface.

9. The method of claim 1, wherein the at least one dispersion compensation module comprises the electrical dispersion compensation module or the optical dispersion compensation module.

10. The method of claim 1, wherein the host network computing device obtains the second set of parameters from the POT after second set of parameters have been automatically determined by the POT and stores the at least one set of parameters that have been obtained in a data store.

11. The method of claim 10, wherein the second set of parameters are obtained by the host network computing device prior to the occurrence of the link failure.

12. A network computing device, comprising:
    a computer processor;
    a host management interface for communicating with an industry-standard small form factor pluggable optical transceiver (POT) with a plurality of dispersion compensation modules included therein, the plurality of dispersion compensation modules comprising both an electrical dispersion compensation module and an optical dispersion compensation module;
    the computer processor configured to:
        receive a notification of a link failure in an intensity-modulated direct-detection (IMDD) optical network which requires transitioning data communications from a first optical path of the IMDD optical network having a first chromatic dispersion characteristic to a second optical path of the IMDD optical network having a second chromatic dispersion characteristic different from the first chromatic dispersion characteristic;
        determine a second set of parameters to control at least one compensation module of said POT to compensate for the effects of chromatic dispersion in the second optical path, the second set of parameters different from a first set of parameters used to control the at least one compensation module to compensate for the effects of chromatic dispersion in the first optical path; and communicate the second set of parameters to the POT through the host management interface to reconfigure the POT to use the second set of parameters in place of the first set of parameters for dispersion compensation;

wherein the POT is configured to automatically determine at least one of the first and second set of parameters; and wherein the computer processor is configured to provide seed values to the POT to facilitate automatically determining the second set of parameters, the seed values based on a known length of the second optical fiber or a known distance between a first POT and a second POT.

13. The network computing device of claim 12, wherein the second optical path has an optical path length that is different as compared to an optical path length of the first optical path.

14. The network computing device of claim 13, wherein the first optical path is comprised of a first optical fiber and the second optical path is comprised of a second optical fiber used in place of the first optical fiber.

15. The network computing device of claim 14, wherein the second optical fiber has a different physical length than the first optical fiber, whereby the at least one dispersion compensation module requires a different set of parameters to cause the at least one dispersion compensation module to compensate for the effects of chromatic dispersion in the second optical fiber as compared to the first optical fiber.

16. The network computing device of claim 15, wherein the computer processor is configured to access the POT through the host management interface to determine at least one of the first and second set of parameters to be utilized when the first or second optical path is in use.

17. The network computing device according to claim 14, wherein the second optical fiber is selected from among a plurality of alternate optical fibers which can be used in place of the first optical fiber.

18. The network computing device of claim 17, wherein the second optical fiber is automatically selected by at least one of the computer processor and a network operations control server which controls the optical network.

19. The network computing device according to claim 12, wherein the notification of the link failure is communicated to the computer processor by the POT through the host management interface.

20. The network computing device of claim 12, wherein the at least one dispersion compensation module comprises the electrical dispersion compensation module or the optical dispersion compensation module.

21. The network computing device of claim 12, wherein the computer processor is configured to obtain the second set of parameters from the POT after second set of parameters have been automatically determined by the POT, and to store the second set of parameters in a data store of the network computing device.

22. The network computing device of claim 21, wherein the computer processor is configured to obtain the second set of parameters prior to the occurrence of the link failure.

23. A method for controlling dispersion compensation, comprising:

selecting at least one dispersion compensation module of a plurality of dispersion compensation modules included within an industry-standard small form factor pluggable optical transceiver (POT) to be initialized, wherein the plurality of dispersion compensation modules comprise both an electrical dispersion compensation module and an optical dispersion compensation module;

causing a first set of parameters to control the selected at least one dispersion compensation module to compensate for the effects of chromatic dispersion in a first optical path having a first chromatic dispersion characteristic;

receiving by a host network computing device a notification of a link failure in an optical network which requires transitioning data communications from the first optical path to a second optical path having a second chromatic dispersion characteristic different from the first chromatic dispersion characteristic;

determining by the host network computing device a second set of parameters different from the first set of parameters to control the at least one dispersion compensation module to compensate for the effects of chromatic dispersion in the second optical path; and using the host network computing device to communicate with the POT through a host management interface to reconfigure the POT to use the second set of parameters in place of the first set of parameters for dispersion compensation;

wherein the POT is configured to automatically determine at least one of the first and second set of parameters;

wherein the host network computing device obtains the second set of parameters from the POT after second set of parameters have been automatically determined by the POT and stores the at least one set of parameters that have been obtained in a data store; and wherein determining, by the host network computing device, the second set of parameters comprises:

determining, by the POT, the second set of parameters by:
  transmitting a predetermined data pattern to a second POT;
  receiving a link quality report comprising an evaluation of the predetermined data pattern by the second POT; and
  in response to the link quality report indicating an unacceptable link quality, performing a fine adjustment to one or more of the second parameters; and obtaining, by the host network computing device, the second set of parameters from the POT after the POT determined the second set of parameters.

* * * * *